United States Patent
Kanitz et al.

(10) Patent No.: US 12,194,564 B2
(45) Date of Patent: Jan. 14, 2025

(54) METHOD AND SYSTEM FOR LASER PROCESSING OF WORKPIECES IN LIQUID

(71) Applicant: LIDROTEC GMBH, Bochum (DE)

(72) Inventors: Alexander Kanitz, Bochum (DE); Jan Stefan Hoppius, Hilden (DE); Jannis Köhler, Schermbeck (DE); Alexander Igelmann, Bochum (DE)

(73) Assignee: LIDROTEC GMBH, Bochum (DE)

( * ) Notice: Subject to any disclaimer, the term of this patent is extended or adjusted under 35 U.S.C. 154(b) by 0 days.

(21) Appl. No.: 18/288,210

(22) PCT Filed: Apr. 26, 2022

(86) PCT No.: PCT/EP2022/061047
§ 371 (c)(1),
(2) Date: Oct. 25, 2023

(87) PCT Pub. No.: WO2022/229182
PCT Pub. Date: Nov. 3, 2022

(65) Prior Publication Data
US 2024/0238899 A1    Jul. 18, 2024

(30) Foreign Application Priority Data
Apr. 30, 2021  (DE) ............. 10 2021 111 172.2

(51) Int. Cl.
*B23K 26/122* (2014.01)
*B23K 26/03* (2006.01)
(Continued)

(52) U.S. Cl.
CPC .......... *B23K 26/122* (2013.01); *B23K 26/032* (2013.01); *B23K 26/0622* (2015.10); *B23K 26/082* (2015.10); *B23K 26/38* (2013.01)

(58) Field of Classification Search
CPC .. B23K 26/03; B23K 26/032; B23K 26/0622; B23K 26/0624; B23K 26/082;
(Continued)

(56) References Cited

U.S. PATENT DOCUMENTS

| | | | | |
|---|---|---|---|---|
| 6,049,058 A | * | 4/2000 | Dulaney | B23K 26/1224 219/121.84 |
| 2002/0050489 A1 | * | 5/2002 | Ikegami | H01L 21/32134 257/E21.309 |

FOREIGN PATENT DOCUMENTS

| | | |
|---|---|---|
| CN | 112589261 A | 4/2021 |
| CN | 113146078 A | 7/2021 |

(Continued)

OTHER PUBLICATIONS

English Language Translation of Cited CN112589261 (Year: 2021).*
(Continued)

*Primary Examiner* — Dana Ross
*Assistant Examiner* — Joseph W Iskra
(74) *Attorney, Agent, or Firm* — The Webb Law Firm (57) ABSTRACT

A method for laser processing of workpieces in liquid, the method including the following steps:
  providing a workpiece in a process chamber filled with a liquid;
  focusing pulsed laser radiation on a surface of the workpiece using a focusing unit;
  producing a relative movement between the focused laser radiation and the workpiece surface using a positioning unit;
  detecting a gas bubble in a predefined detection region using a detection unit; and
  conducting a first action to avoid or reduce interaction effects between the laser radiation and the detected gas bubble.

8 Claims, 5 Drawing Sheets

(51) Int. Cl.
*B23K 26/0622* (2014.01)
*B23K 26/082* (2014.01)
*B23K 26/38* (2014.01)

(58) Field of Classification Search
CPC .... B23K 26/122; B23K 26/127; B23K 26/16;
B23K 26/38; B23K 26/702
USPC .................................................. 219/121.84
See application file for complete search history.

(56) References Cited

FOREIGN PATENT DOCUMENTS

| | | |
|---|---|---|
| JP | H07232291 A | 9/1995 |
| JP | 2016101594 A | 6/2016 |
| JP | 2022067857 A | 5/2022 |

OTHER PUBLICATIONS

Dittrich, Sarah, et al., "Plasma and nanoparticle shielding during pulsed laser ablation in liquids cause ablation efficiency decrease", Opto-Electronic Advances, 2021, vol. 4, No. 1.

Hoppius, Jan S., et al., "Optimization of femtosecond laser processing in liquids", Applied Surface Science, 2019, pp. 255-260, vol. 467-468.

Zhou, Jia, et al., "Study on the mechanism of ultrasonic-assisted water confined laser micromachining of silicon", Optics and Lasers in Engineering, 2020, vol. 132.

\* cited by examiner

METHOD AND SYSTEM FOR LASER PROCESSING OF WORKPIECES IN LIQUID

CROSS-REFERENCE TO RELATED APPLICATIONS

This application is the United States national phase of International Application No. PCT/EP2022/061047 filed Apr. 26, 2022, and claims priority to German Patent Application No. 10 2021 111 172.2 filed Apr. 30, 2021, the disclosures of which are hereby incorporated by reference in their entireties.

BACKGROUND OF THE INVENTION

Field of the Invention

The present invention relates to a method for laser processing of workpieces in liquid and a corresponding system.

The advantages of processing workpieces with the use of laser radiation are generally known. The use of laser radiation allows, in particular, for high precision in material processing and for high process rates. It can be considered a challenge in material processing with a laser that the processed workpiece is locally strongly heated due to the use of focused laser radiation. The resulting thermal effects outside the processing zone are generally undesired.

To improve the laser processing process, in some applications, the laser processing process takes place in a liquid. In such a case, the workpiece to be processed is arranged in a process chamber filled with the liquid, so that the workpiece is cooled by the liquid throughout the entire process.

Further, with such process chambers, it is in some cases provided that the liquid in the chamber is permanently replaced during the processing process. Generally, pumps are used for this purpose which produce a flow within the process chamber and constantly exchange the liquid in the process chamber.

It can be considered a disadvantage of laser processing workpieces in liquid that gas bubbles may form in the process chamber. The reasons for the formation of the gas bubbles may be manifold. In particular, the gas bubbles can be formed by the interaction of the laser radiation and the workpiece or by the circulation of the liquid.

DESCRIPTION OF THE INVENTION

For example, adherent bubbles (also referred to as persistent bubbles) can be caused by the laser process and form on the workpiece surface in the region of the surface processed. These may detach from the workpiece surface over time and move through the process chamber as free gas bubbles. Moreover, due to an exchange of liquid in the system, they may move through the system several times and thereby repeatedly interfere with the laser processing process.

On the other hand, gas bubbles may form in the system, which are produced independently of the interaction between the laser radiation and the workpiece. For example, free gas bubbles may be produced upon system start-up if the process chamber or the hoses are filled with air in the initial state. When filling the process chamber with liquid conveyed into the chamber from a reservoir, gas bubbles often form inside the process chamber. Here, air is flushed several times from the hoses into the liquid reservoir in the form of gas bubbles and is pumped from there back into the hose-chamber system. The gas bubbles often reach the liquid surface in the reservoir only after several minutes, and only then do they no longer interfere with the laser processing process.

As already explained initially, two different types of gas bubbles are usually formed in the process chamber, i.e. on the one hand, adherent or persistent gas bubbles which generally adhere to the workpiece surface, and on the other hand, free gas bubbles that can move through the process chamber or even through the entire system (process chamber, hoses, reservoir). Basically, it applies that adherent gas bubbles can become free gas bubbles over time and vice versa.

Regardless of the specific type of the gas bubbles, it always applies that those gas bubbles that are in the effective range of the laser radiation cause an undesired interaction with the laser radiation. The reason for this is the difference in the refractive index of air and liquid, which causes undesired reflection and diffraction of the laser radiation used at the interface between the liquid and the gas bubble.

To solve the above-described problem, the invention proposes a method for laser processing of workpieces in liquid, the method comprising the following steps:
  providing a workpiece in a process chamber filled with a liquid;
  focusing a pulsed laser radiation onto a surface of the workpiece using a focusing unit;
  producing a relative movement between the focused laser radiation and the workpiece surface by using a positioning unit;
  detecting a gas bubble in a predefined detection region by using a detection unit; and
  conducting a first action to avoid or reduce interaction effects between the laser radiation and the detected gas bubble.

SUMMARY OF THE INVENTION

The method of the invention allows to eliminate or at least significantly reduce possible interference effects caused by gas bubbles in the process chamber. Thereby, the process rate can be increased, while simultaneously enhancing the quality of the processed workpieces. The method of the present invention in particular allows for an improvement of the cut edges during the laser cutting process, the improvement being achieved by the reduction of the interference effects.

The liquid used may be water, for example. The focusing unit used may be configured in particular as a focusing lens, a focusing mirror or a lens system. The relative movement may be produced either by a deflection of the radiation or by the positioning of the workpiece. In that respect, the positioning unit may be implemented by a pivotable mirror (also referred to as a scanner mirror), a rotatable mirror (e.g. a polygonal scanner) or in the form of a positioning table. The forming of possible gas bubbles can be monitored in a detection region which, for example, encompasses the entire process chamber. Here, the detection region may include a contiguous region, but also regions separate from each other. For example, it may be provided that the detection region includes the interior of the process chamber on the one hand, and on the other hand monitors the hoses through which the liquid but also gas bubbles may be introduced into the chamber. In this case, the detection region may be static or dynamic. A static detection region may be advantageous, for example, when the entire interior of the process chamber is to be monitored. However, in some embodiments it may be explicitly desired that not the entire process chamber is monitored, but only a part of the process chamber in which the laser radiation is currently effective. This may be desired for relatively large process chamber, for example, since possible gas bubbles may be far away from the laser radiation, so that they do not interfere with the laser process and a removal of such gas bubbles is therefore not ultimately necessary. In this case, it may be provided that the detection region is set dynamically as a function of the present laser beam position.

In the first action, one or a plurality of steps are performed to avoid or at least reduce interference effects during the laser processing of the workpiece caused by the detected gas bubble. The steps may in particular serve to eliminate the detected gas bubbles from the process region. In this context, the addition "first" should not be understood as a restriction or a reference to further actions. Rather, this addition serves for easier reference in the context of the present application. The first action is conducted every time a gas bubble is detected in the predefined detection region. According to one embodiment of the present invention it may be provided that the first action is conducted until no gas bubble is present in the detection region anymore. The first action is conducted in response to the detection of the gas bubbles and can be conducted in particular in dependence on the detected bubble (e.g., location and size of the bubble).

Although the method of the invention has been described above with a concrete order of method steps for ease of understanding, it is obvious to a skilled person that, in the present invention, it is not necessary for achieving the technical effect to ultimately perform the individual steps in a specific order.

According to an embodiment of the method of the invention, it may be provided that the detection of the gas bubbles comprises the following steps:
  capturing a photographic image of the predefined detection region with the use of a camera unit and generating a corresponding image file; and
  evaluating the image file, the evaluation particularly comprising the use of a pattern recognition algorithm.

According to this embodiment, an automated detection of possible gas bubbles can be made, wherein an action for removing the bubble can be conducted automatically in the event of a detected gas bubble. In addition, it may be provided that the action to be conducted is selected automatically and in dependence on the location and the size or the type of the detected bubble (e.g., free or adherent bubble). The use of a pattern recognition algorithm further allows to increase the degree of automation of the method according to the invention.

Further, it may be provided, according to the present invention, that the detection of the gas bubble comprises a scattered light measurement, the scattered light measurement comprising in particular the following steps:
  illuminating the detection region with the use of an LED;
  picking up a detection signal with the use of a photodiode, the photodiode being configured to pick up the radiation emitted by the LED after its propagation through the detection region;
  evaluating the detection signal with the use of an evaluation unit.

Here, the LED and the photodiode may, for example, be arranged on two opposite sides of the process chamber, the light emitted by the LED can enter the chamber through a first process window, whereas the scattered light can be guided out of the chamber through a second process window and subsequently be captured by the photodiode.

As an alternative to the LED, other light sources may also be used, such as a halo-gen lamp or a laser light source. However, the use of an LED is advantageous in that LEDs are easy to control and are available at low cost. The monitored detection region may, for example, comprise the entire interior of the process chamber or, alternatively, only a part of the process chamber. It may also provide that individual sections of the supply or discharge hoses are monitored, in which the formation of gas bubbles can be expected. The evaluation unit may, in particular, comprise a computing unit. For example, the evaluation unit may comprise a PC, a laptop, or a microcontroller. In the evaluation, the detection signal generated by the photodiode can be compared in particular with reference signals previously picked up during a calibration process. For example, during calibration, a reference signal may have been picked up in an application scenario in which no gas bubble was present in the detection region. If the detection signal deviates significantly from the reference signal, it can be concluded therefrom that a gas bubble is present between the LED and the photodiode.

It may further be provided that the detection unit comprises an ultrasonic detector, a radar sensor, a capacitive sensor and/or an electromagnetic sensor. It may also be provided that the detection unit comprises an oxygen sensor unit. Measuring the oxygen concentration in the process chamber gives information on the probability that gas bubbles are present in the liquid, since the oxygen concentration of detached gas bubbles or micro-bubbles significantly differs from the oxygen concentration of liquids.

According to another embodiment of the invention, it may be provided that the first action comprises a change of the flow rate of the liquid in the process chamber. It may be provided, in particular, that the flow rate in the chamber is abruptly increased upon the detection of a gas bubble, so that the gas bubble detected in the detection region can be removed. It may also be provided that the flow direction is reversed to achieve a more efficient removal of the detected gas bubble. Here, the reversal of the flow direction can be effected several times in sequence and can preferably be repeated until a detected gas bubble adhering to a surface is detached from this surface. The flow inside the chamber can be generated in particular by using pumps which pump liquid into the chamber or out from the chamber. As an alternative, it can be provided that the flow is generated by a movement of the chamber.

According to the present invention, it may also be provided that the first action comprises a positioning of the laser radiation such that the laser radiation is directed to the detected gas bubble. In particular with adherent gas bubbles, it may thus be achieved that the gas bubble is detached from the surface to which the gas bubble adheres. If, for example, the gas bubble adheres to the workpiece surface and the laser radiation is directed to the gas bubble, the interaction of the laser radiation with the workpiece surface causes shock waves which contribute to the detachment of the gas bubble from the workpiece surface. Thus, the same laser beam is advantageously used for material processing and for detaching the adherent gas bubbles. In this embodiment of the invention, the laser beam is thus used as a combined tool for processing the workpiece and for detaching the gas bubbles, so that no additional components are required for detaching the gas bubbles.

According to another embodiment of the present invention, it may be provided that the laser radiation is directed in a defocused form onto the region of the workpiece surface in which an adherent gas bubble was detected. Thereby, the generation of the shock wave can be performed in a larger region of the workpiece surface, whereby a more uniform and more efficient detaching of the gas bubble from the workpiece surface is made possible. The beam diameter on the workpiece surface may be set such that it is 50%, 80% or 100% of the gas bubble diameter. The de-focusing of the laser radiation can be effected in particular by a variation of the position of the focusing unit or by a variation of the position of the workpiece.

According to an embodiment of the invention, it may further be provided that the first action is the generation of ultrasonic waves in the vicinity of the detected gas bubble by using an ultrasonic generator. For this purpose, it may in particular be provided that an ultrasonic generator is arranged in the immediate vicinity of the workpiece or also in the immediate vicinity of the hoses or lines used to generate the flow in the process chamber. The ultrasonic generator may in particular comprise a piezo element which is controlled electrically.

Moreover, according to the present invention, it may be provided that the first action includes a change in the flow type, where the flow type can in particular be varied between laminar, turbulent and pulsating. First studies showed that a particularly efficient detachment of adherent gas bubbles can be achieved by varying the flow type.

Moreover, the following steps can be provided according to the present invention:
  determining a transit time for the detected gas bubble in which the gas bubble is present in a region in which an interaction between the laser radiation and the gas bubble is to be expected; and
  deactivating the laser radiation for the duration of the determined transit time; or
  positioning the laser radiation such that the laser radiation is arranged outside the gas bubble.

In determining the transit time, it is in particular possible to use a camera-based method in which the speed at which a free gas bubble moves in the detection region is determined. Subsequently, it can be calculated at which time and for which duration the detected gas bubble is in the region in which an interaction between the laser radiation and the gas bubble is to be expected (=transit time). Eventually, the laser radiation is deactivated for the determined transit time or is transferred to another position where no interaction occurs between the laser radiation and the gas bubble. For a deactivation of the laser radiation, it is possible, for example, to switch off the laser beam source or, as an alternative, to use a beam absorber. As an alternative, a beam modulator, in particular an acousto-optical modulator (also referred to as ACM) or an electro-optical modulator (also referred to as EOM) can be used for a particularly fast deflection of the radiation. As soon as the detected gas bubble has left the collision region, the laser radiation can be activated again. As an alternative, it can be provided that a laser beam trajectory is predefined for a laser processing process, wherein it was calculated when detecting the gas bubble that an interaction between the laser radiation and a free gas bubble is imminent. In this case, the laser radiation can leave the preset trajectory and thereby "skip" the collision region, so that this region of the workpiece is processed at a later time as soon as the gas bubble has left the collision region. In this manner, interactions between the laser radiation and the gas bubble are significantly reduced and the process quality and speed are significantly increased.

To achieve the above-described object, according to another embodiment of the present invention, a system for the laser processing of workpieces in liquids is pro-posed, which comprises:
  a laser beam source for generating pulsed laser radiation;
  a focusing unit for focusing the laser radiation onto the surface of a workpiece;
  a process chamber for receiving a workpiece;
  a positioning unit for adjusting the position of the laser radiation on the surface of the workpiece;
  a detection unit for detecting a gas bubble in a predefined detection region; and
  a control unit, the control unit being configured to conduct a first action to avoid or reduce interference effects between the laser radiation and the detected gas bubble.

The system according to the invention allows to significantly increase the process speed and the processing quality by significantly avoiding or significantly reducing the undesired interaction effects between the focused laser radiation and the gas bubbles. The laser beam source may in particular be a laser beam source designed for the generation of ultra-short pulses of a pulse duration of about 100 fs to 100 ps. The control unit may in particular be designed to achieve a first action to avoid or reduce interference effects during laser processing, the interference effects being caused by the interaction between the laser radiation and the detected gas bubbles.

According to one embodiment of the system of the present invention, it may be provided that the detection unit comprises a camera unit for monitoring the detection region.

Further, it may be provided in the system of the present invention that the detection unit comprises an LED and a photodiode, the photodiode being configured to pick up the radiation emitted by the LED after its propagation through the detection region. Here, the LED and the photodiode can be arranged on two opposite sides of the process chamber. The light of the LED can be introduced into the process chamber via a first process window, while this light is guided out of the chamber via a second process window so that it can be detected by the photodiode.

According to another embodiment of the system of the present invention, it may further preferably be provided that the system comprises a flow generator configured to adjust the flow rate and/or the flow direction and/or the flow type inside the process chamber as a function of whether a gas bubble was previously detected in the detection region or not. In the event of a detected gas bubble, it is thus possible to remove the same from the processing region by adjusting the flow inside the process chamber. Here, the above-described bubble removal strategies may be implemented. The flow generator may in particular comprise one or a plurality of pressure and suction pumps.

Moreover, it may be provided according to an embodiment of the system of the present invention that the system comprises an ultrasonic generator configured to generate ultrasonic waves in the detection region if a gas bubble was previously detected in the detection region. It is possible to thereby achieve in particular a particularly efficient detachment of adherent gas bubbles.

BRIEF DESCRIPTION OF THE DRAWINGS

In the following, the present invention is illustrated in more detail with reference to the Figures which show.

DESCRIPTION OF THE INVENTION

Figure 1:
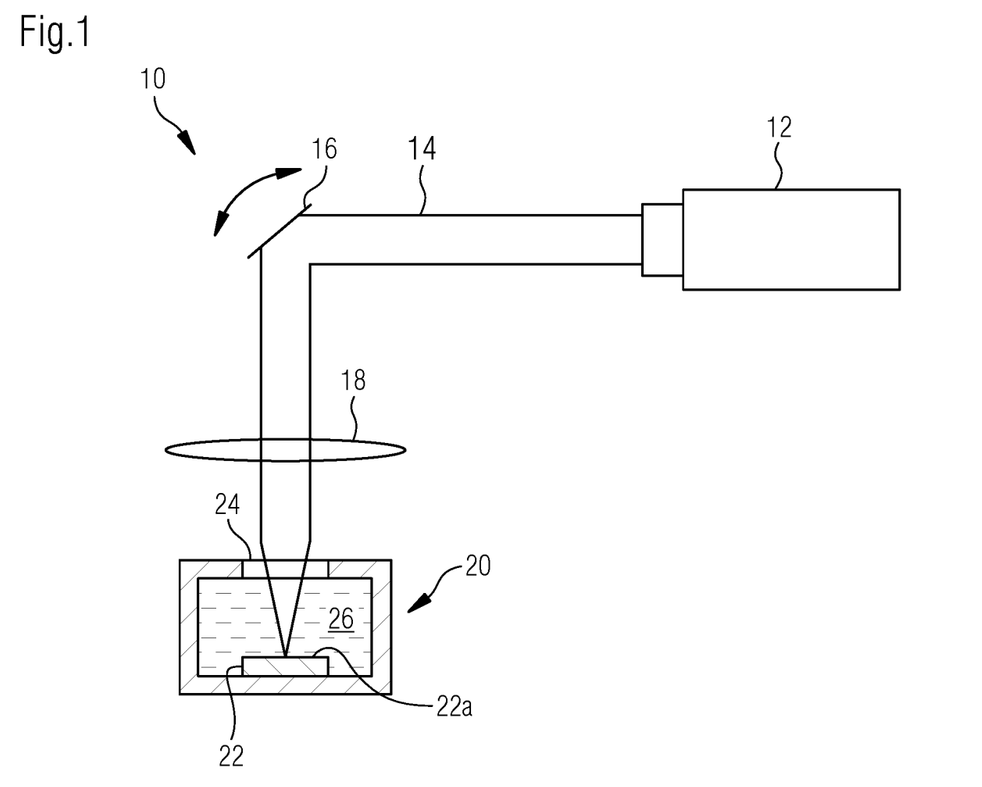
FIG. 1 a system for laser material processing in liquid according to prior art, FIG. 2 the laser processing process in the ideal case and in the presence of a gas bubble in the processing region.

FIG. 1 shows a system 10 for laser processing in liquid which is already known from prior art. Such a system 10 comprises a laser beam source 12 that generates a pulsed laser radiation 14. The orientation of the laser radiation 14 can be adjusted through a positioning unit 16. The laser radiation 14 is focused into the interior of a process chamber 20 via a focusing unit 18. A workpiece 22 to be processed is arranged in the process chamber 20. The focused laser radiation 14 is directed onto a surface 22a of the workpiece 22, so that the workpiece 22 is heated precisely at the desired location and can evaporate. Here, the laser radiation enters the process chamber 20 via a transparent process window 24, the process chamber 20 other-wise not being permeable to light. The process chamber 20 is filled with a liquid 26. The liquid 26 used may be water, for example. The liquid serves to cool the workpiece during the processing process, for example.

Figure 2:
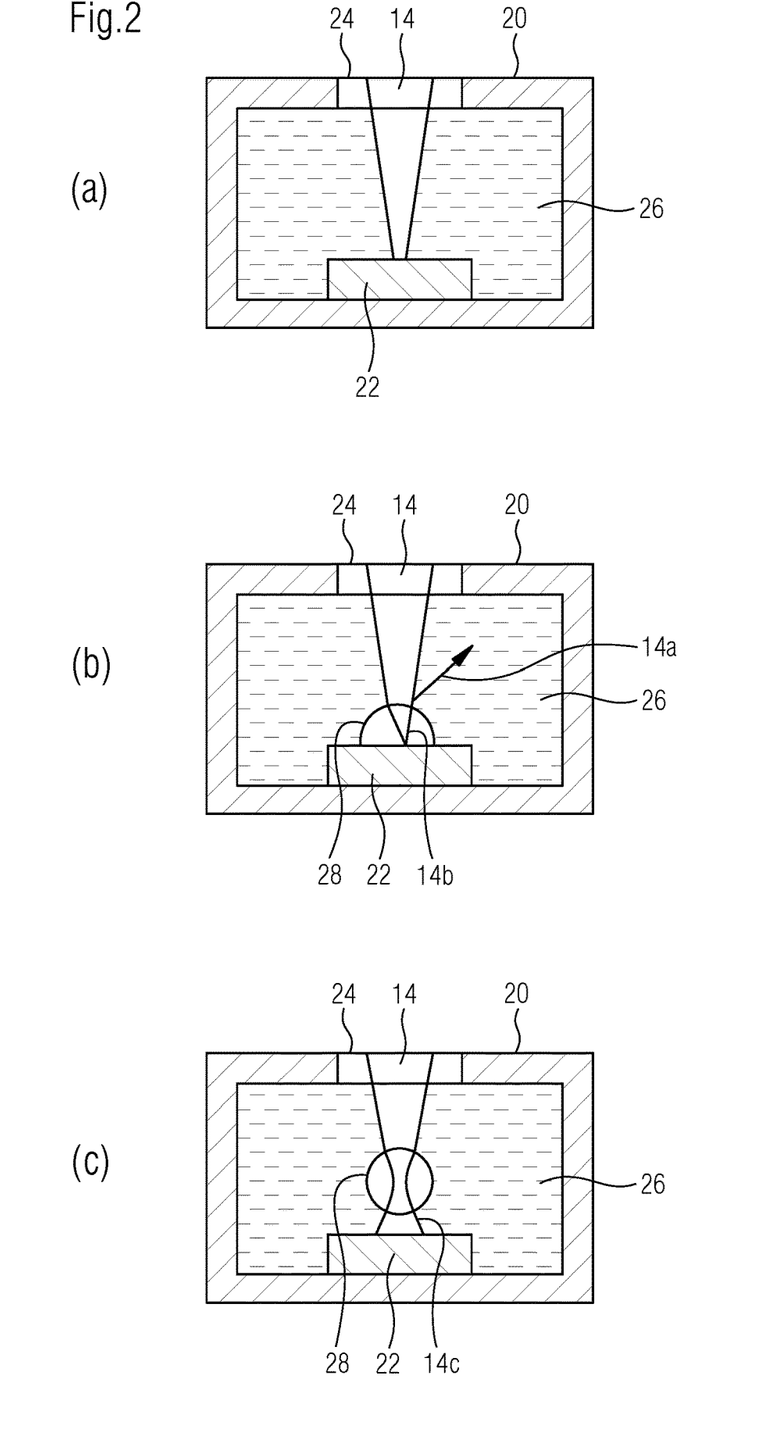

FIG. 2 illustrates the problems arising in a laser processing process according to prior art. As shown in FIG. 2, laser processing in liquid causes the formation of gas bubbles which have an adverse effect on the laser processing process.

First, FIG. 2(a) shows the ideal case in which no gas bubbles are present in the process chamber 20. In this case, the focused laser radiation 14 can impinge unhindered on the surface of the workpiece 22 and heat the workpiece 22.

In contrast thereto, FIG. 2(b) shows the case in which an adherent gas bubble 28 has formed on the surface of the workpiece 22. Due to the difference in the refraction index between the liquid 26 and the gas bubble 28, a part of the incident laser radiation 14 is reflected. The reflected laser radiation 14a does not impinge on the surface of the workpiece 22 and can thus not be used for the processing process. Furthermore, a part of the incident laser radiation 14 is deflected. The deflected laser radiation 14b thus does not impinge on the surface of the workpiece 22 at the desired location. This has an adverse effect on the accuracy of the laser processing process.

FIG. 2(c) shows another scenario, in which a free gas bubble 28 is present in the processing region, which interacts with the focused laser radiation 14. The gas bubble 28 has the effect that the incident laser radiation 14 is defocused and that, consequently, a defocused laser radiation 14c impinges on the surface of the workpiece 22. This regularly results in the radiation intensity (defined as power per area) is insufficient to evaporate the material at the surface of the workpiece 22.

The above illustrated examples show that gas bubbles formed in the process chamber 20 contribute to a significant interference with the laser processing process. In particular, the gas bubbles cause a reduced process speed, a reduced efficiency, in-stabilities, and deviations from the desired processing result.

Figure 3:
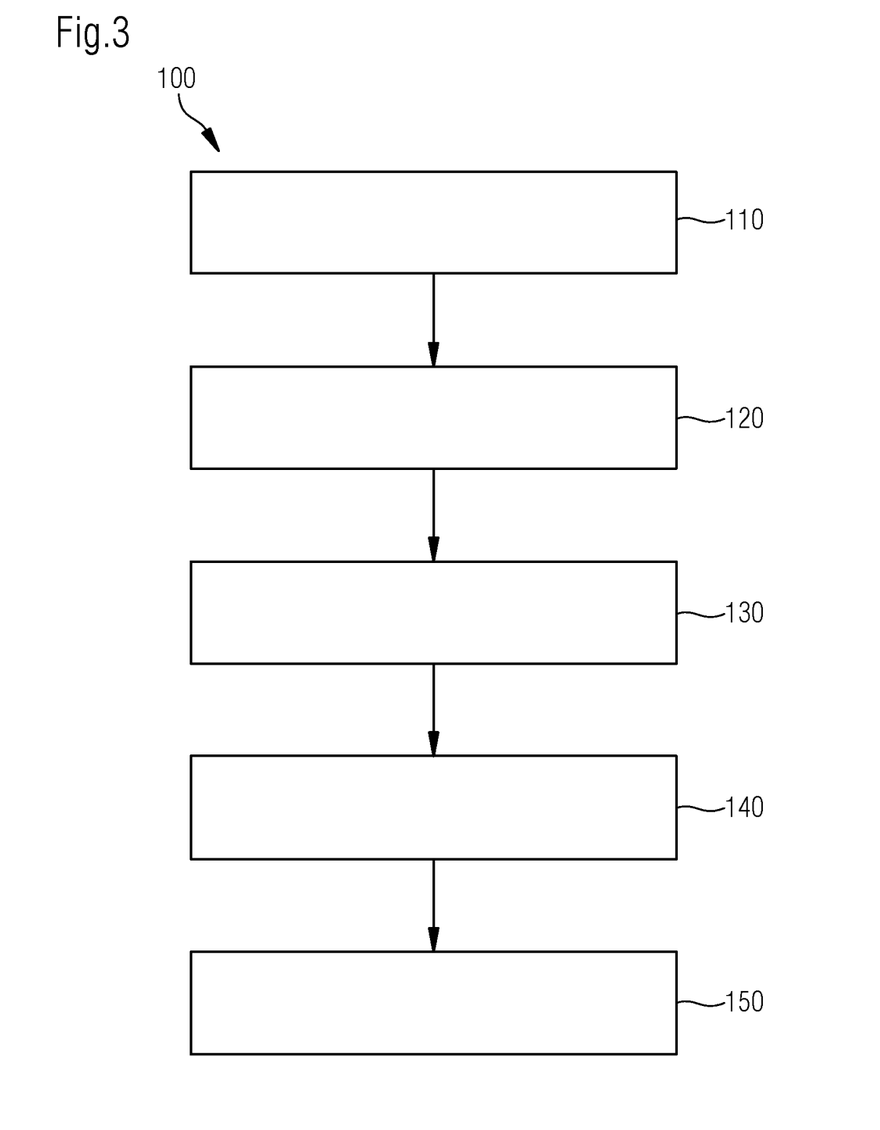
FIG. 3 shows a schematic illustration of an embodiment of the method according to the present invention, FIG. 4 a schematic illustration of embodiments for the detection of gas bubbles according to the present invention, and FIG. 5 a schematic illustration of embodiments of the action for avoiding interaction effects between the laser radiation and the detected gas bubble, according to the present invention.

FIG. 3 shows an embodiment of method 100 according to the invention. To illustrate the embodiment, reference is made hereinafter to a "first step," a "second step," etc. However, this terminology explicitly determines no order ultimately necessary in the framework of the present invention, but rather serves to differentiate between the individual method steps. In a first step 110, a workpiece is provided in a process chamber filled with liquid. A pulsed laser radiation is focused on the surface of the workpiece in a second step 120. Here, a focusing unit is used. For the processing of the workpiece, a relative movement between the focused laser radiation and the workpiece surface is generated in a third step 130, to which end a positioning unit is used. The positioning unit may, for example, be configured as a scanner mirror designed to set the position of the focused laser radiation on the surface of the workpiece, or it may be configured as a positioning table designed to vary the position of the workpiece. In a fourth step 140, a predefined detection region is checked for the presence of a gas bubble. For this purpose, a detection unit is used which may in particular comprise a camera. When a gas bubble is detected, a first action is conducted in a fifth step 150 in order to avoid or reduce interaction effects between the laser radiation and the detected gas bubble. In other words, the first action serves to remove the detected gas bubble from the detection region or the processing region, respectively.

Figure 4:
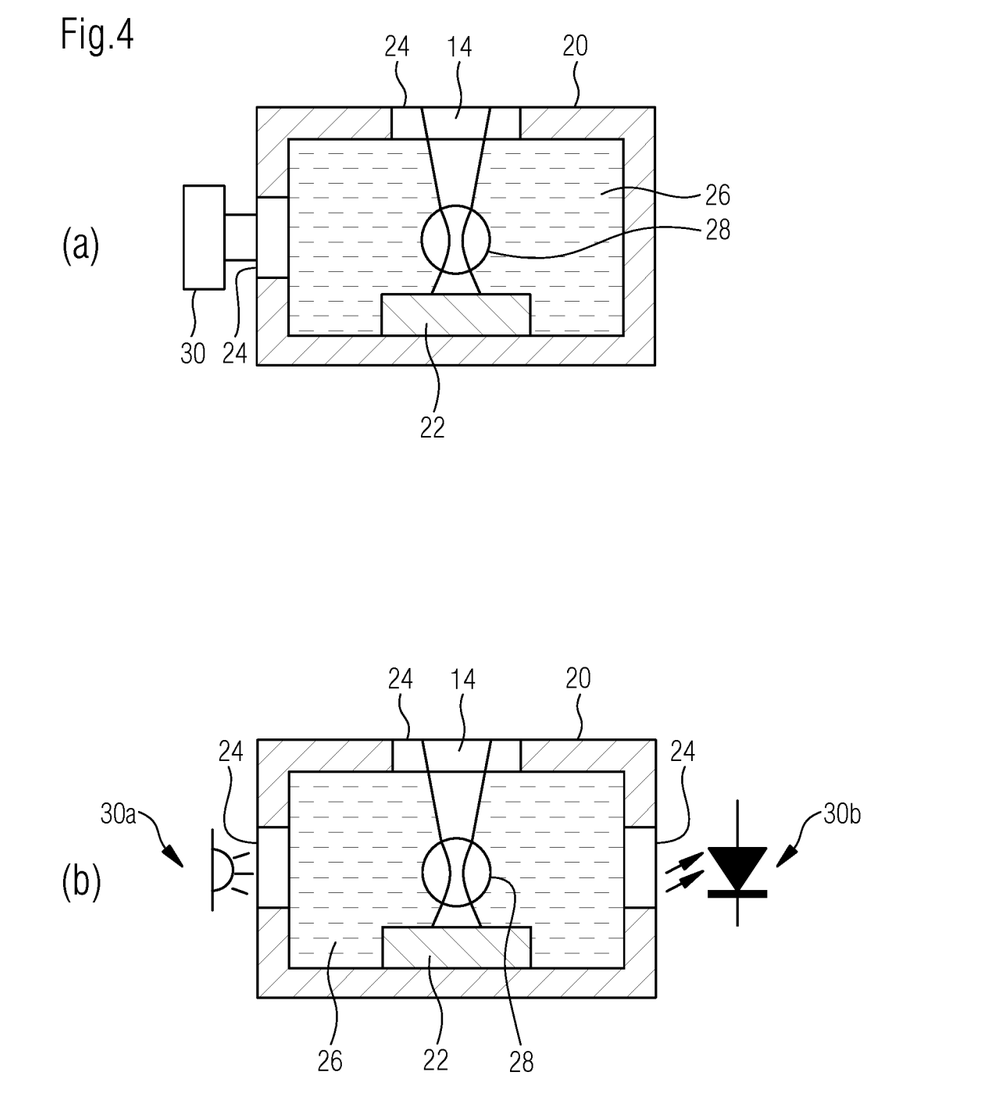

FIG. 4 shows embodiments of the present invention that regard the detection of the gas bubble.

FIG. 4(a) shows an embodiment in which a detection unit 30 is provided that is configured as a camera unit. The camera unit captures a detection region in which gas bubbles are considered as interfering. In particular, the camera unit can monitor the interior of the process chamber 20. The camera unit generates an image file that is subsequently evaluated. When a gas bubble is detected in the generated image file, it may be provided that a corresponding action is conducted to remove the gas bubble and to reduce the interactions. As shown in FIG. 4(a), the camera can be arranged radially with respect to the laser radiation 14. As an alternative, the camera unit may also be positioned axially with respect to the laser radiation. For this purpose, a beam splitter can be used, for example. Further, it may be provided that the detection unit comprises two camera units, each arranged radially with respect to the laser radiation and offset from each other by 90°. By using two camera units, the three-dimensional position of the gas bubble 28 can be determined exactly.

FIG. 4(b) shows a further embodiment, in which the detection unit 30 comprises an LED 30a and a photodiode 30b. Die LED 30a and the photodiode 30b are arranged on two opposite sides of the process chamber 20. The light emitted by the LED 30a enters the interior of the process chamber 20 via a transparent process window 24. If no gas bubble is present in the detection region, the light emitted by the LED 30a can exit directly through the opposite process window 24 and be captured by the photodiode 30b. However, if a gas bubble 28 is present in the detection region, the light emitted by the LED 30a is scattered at the gas bubble 28, so that the photodiode 30b produces a correspondingly modified signal. By comparing the output signal of the photodiode 30b with previously captured reference signals, it can be concluded on whether a gas bubble is present in the monitored detection region.

Figure 5:
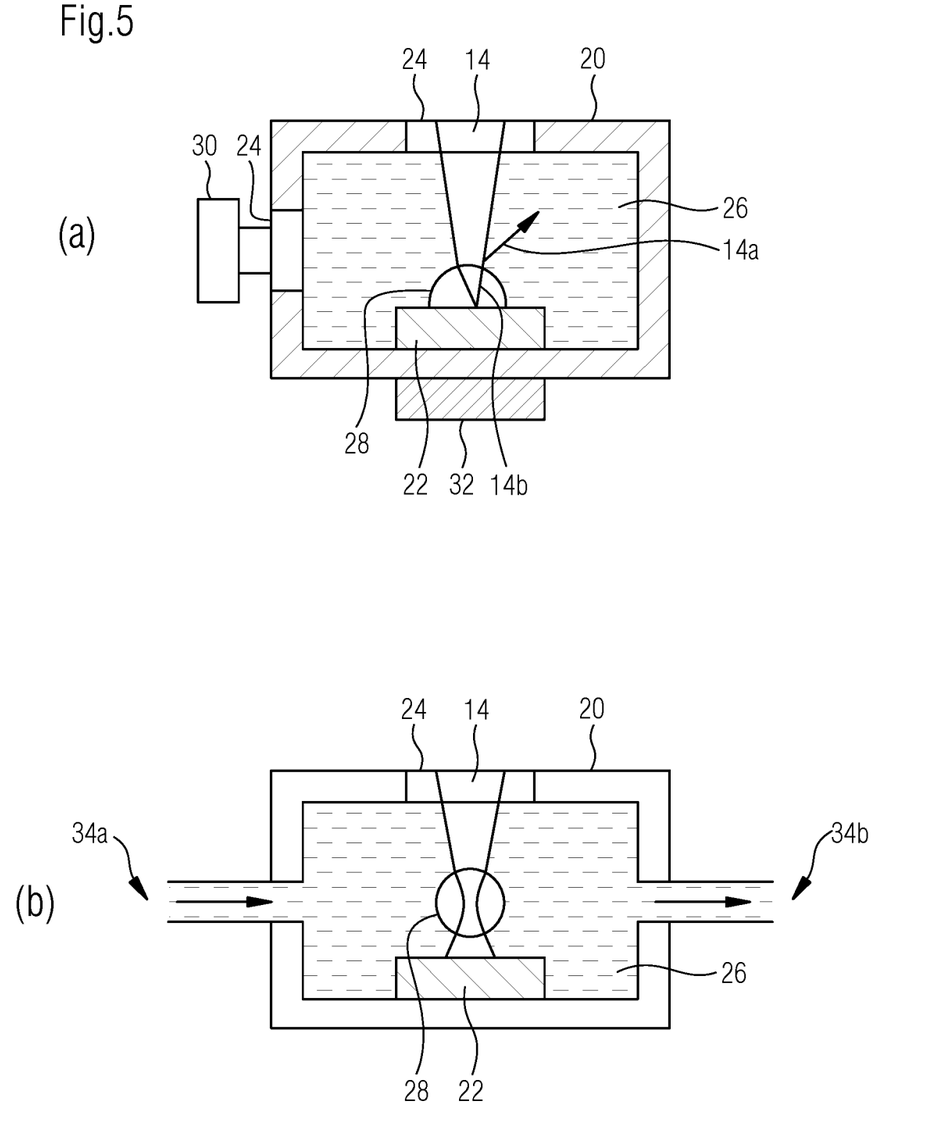

FIG. 5 shows different embodiments of the present invention, which provide different actions for avoiding interaction effects between the laser radiation 14 and the gas bubble 28. In FIG. 5(a), the embodiment illustrated comprises an additional ultrasonic generator 32 arranged at the lower side of the process chamber 20. If the detection unit 30 detects the presence of a gas bubble 28 in the detection region, the ultrasonic generator 32 can be activated by a control unit (not shown in this Figure). Thereby, the gas bubble 28 can be detached from the surface of the workpiece 22. For example, it may be provided that the ultrasonic generator 32 is activated only, when an adherent gas bubble 28 is activated. As already illustrated in FIGS. 2(*b*) and (*c*), adherent and free gas bubbles differ significantly in shape and can therefore be optically differentiated from each other.

Furthermore, FIG. 5(*b*) shows another embodiment of the invention, in which a flow generator 34 is provided. In this embodiment, the flow generator 34 comprises a liquid inlet 34*a* and a liquid outlet 34*b*, as well as a pressure pump and a suction pump connected to the liquid inlet 34*a* and the liquid outlet 34*b*, the pumps mentioned not being illustrated in FIG. 5(*b*). The flow generator 34 is configured to generate a flow in the event of a detected gas bubble 28, by which the gas bubble is transported away from the processing region. It may also be provided that the ultrasonic generator 32 and the flow generator 34 are combined with each other. As such, it is possible, for example, to activate the ultrasonic generator 32 in case an adherent gas bubble 28 was detected, whereas the flow generator 34 is activated in case a free gas bubble was detected. Further, it may be advantageously provided that in the case of a detection of an adherent gas bubble, first the ultrasonic generator 32 is used to detach the gas bubble 28 from the surface of the workpiece 22, whereas the flow generator 34 is activated subsequently to transport the free gas bubble away from the detection region or the processing region, respectively.

LIST OF REFERENCE NUMERALS

10 system for laser processing
12 laser radiation source
14 laser radiation
14*a* reflected laser radiation
14*b* deflected laser radiation
14*c* defocused laser radiation
16 positioning unit
18 focusing unit
20 process chamber
22 workpiece
22*a* workpiece surface
24 process window
26 liquid
28 gas bubble
30 detection unit
30*a* LED
30*b* photodiode
32 ultrasonic generator
34 flow generator
34*a* liquid inlet
34*b* liquid outlet
100 method for laser processing
110 first method step
120 second method step
130 third method step
140 fourth method step
150 fifth method step

The invention claimed is:

1. A method for laser processing of workpieces in liquid, the method comprising the following steps:
providing a workpiece in a process chamber filled with a liquid;
focusing a pulsed laser radiation onto a surface of the workpiece using a focusing unit;
generating a relative movement between the focused laser radiation and the workpiece surface using a positioning unit;
detecting a gas bubble in a predefined detection region using a detection unit;
conducting a first action to avoid or reduce interference effects during laser processing which are caused by the detected gas bubble; and
determining a transit time for the detected gas bubble, in which the gas bubble is present in a region in which an interaction between the laser radiation and the gas bubble is to be expected; and
deactivating the laser radiation for the duration of the determined transit time; or
positioning the laser radiation such that the laser radiation is arranged outside the gas bubble.

2. The method according to claim 1, wherein the detection of the gas bubble comprises the following steps:
capturing a photographic image of the predefined detection region using a camera unit and generating a corresponding image file; and
evaluating the image file, the evaluation particularly comprising the use of a pattern recognition algorithm.

3. The method according to claim 1, wherein the detection of the gas bubble comprises a scattered light measurement, the scattered light measurement comprising in particular the following steps:
illuminating the detection region using an LED;
picking up a detection signal using a photodiode, the photodiode being configured to receive the radiation emitted by the LED after propagating through the detection region;
evaluating the detection signal using an evaluation unit.

4. The method according to claim 1, wherein the first action comprises a change of the flow rate in the process chamber.

5. The method according to claim 1, wherein the first action comprises a positioning of the laser radiation such that the laser radiation is directed onto the detected gas bubble.

6. The method according to claim 5, wherein the laser radiation is directed in a defocused form onto the region of the workpiece surface in which the gas bubble has been detected.

7. The method according to claim 1, wherein the first action comprises a generation of ultrasonic waves in the vicinity of the detected gas bubble using an ultrasonic generator.

8. The method according to claim 1, wherein the first action comprises a change in the flow type, wherein the flow type can in particular be varied between laminar, turbulent and pulsating.

* * * * *